(12) United States Patent
Wu et al.

(10) Patent No.: US 6,439,768 B1
(45) Date of Patent: Aug. 27, 2002

(54) ELECTRONIC THERMOMETER AND TEMPERATURE PREDICTION METHOD THEREFOR

(75) Inventors: Shu-Mei Wu; Tung-Chuang Jan; Chao-Wang Chen, all of Taipei (TW)

(73) Assignee: Taidoc Corp. Ltd., Taipei (TW)

( * ) Notice: Subject to any disclaimer, the term of this patent is extended or adjusted under 35 U.S.C. 154(b) by 0 days.

(21) Appl. No.: 09/472,746

(22) Filed: Dec. 27, 1999

(51) Int. Cl.$^7$ .................................................. G01K 7/42
(52) U.S. Cl. ........................................ 374/169; 374/102
(58) Field of Search ............................... 374/169, 208, 374/102; 702/131

(56) References Cited

U.S. PATENT DOCUMENTS

| | | | | |
|---|---|---|---|---|
| 3,822,598 A | * | 7/1974 | Brothers et al. | 374/169 |
| 3,929,018 A | * | 12/1975 | Turner | 374/158 |
| 4,565,456 A | * | 1/1986 | Iida et al. | 374/169 |
| 4,878,184 A | * | 10/1989 | Okada et al. | 374/169 |
| 5,011,294 A | * | 4/1991 | Yamaguchi | 374/107 |
| 5,066,141 A | * | 11/1991 | Ikeda et al. | 374/169 |
| 5,293,877 A | * | 3/1994 | O'Hara et al. | 374/131 |
| 5,392,031 A | * | 2/1995 | Toriumi et al. | 374/102 |
| 6,270,252 B1 | * | 8/2001 | Siefert | 374/102 |
| 6,342,037 B1 | * | 1/2002 | Roe et al. | 422/1 |

FOREIGN PATENT DOCUMENTS

SU   0283632   * 10/1970   .................. 374/169

* cited by examiner

Primary Examiner—Diego Gutierrez
Assistant Examiner—Lydia De Jesus
(74) Attorney, Agent, or Firm—Rabin & Berdo, P.C.

(57) ABSTRACT

A thermometer having a symmetrical probe with a sensor for sensing temperatures and a processor, a method for calculating temperature of an object by a second-order differential equation comprises the steps of obtaining temperatures from object, performing a first temperature calculation to obtain an initial prediction of temperature of object, adding a compensation coefficient, generating a compensated temperature based on a combination of initial prediction of temperature of object and compensated coefficient, and calculating a stabilized prediction of temperature of object based on compensated temperature before sensor has reached temperature of object. This thermometer can effectively decreasing error during heat transfer process.

10 Claims, 5 Drawing Sheets

ELECTRONIC THERMOMETER AND TEMPERATURE PREDICTION METHOD THEREFOR

BACKGROUND OF THE INVENTION

1. Field of Invention

The present invention relates to thermometers and more particularly to an electronic thermometer and temperature prediction method therefor in which a compensation coefficient is included in the predictive mode and a symmetrically shaped probe is employed so as to rapidly precisely obtain a stabilized temperature measurement.

2. Related Art

Conventionally, there are two kinds of probe, i.e., contact based thermometer such as glass bulb thermometer incorporating a heat responsive mercury column. Such glass bulb thermometer is disadvantageous in that it usually takes 2 to 8 minutes to reach a thermal equilibrium between thermometer and a patient's body temperature prior to taking the patient's temperature. Further, the calibrated temperature scale of glass bulb thermometer is not easy to read and thus, measurements are prone to human error.

Another kind of thermometer is non contact based thermometer such as an electronic thermometer. The provision of electronic thermometer aims at minimizing or eliminating these disadvantages. A typical electronic thermometer comprises a probe for sensing the temperature of a selected part of human body, a processor for processing temperature data, and a display for displaying temperature values.

For rapidly obtaining an accurate temperature, a temperature sensitive electronic probe coupled with prediction circuitry is provided in the electronic thermometer so as to obtain a direct display of the patient's temperature before the probe has reached equilibrium with the patient. With this approach, assuming the patient's temperature is not significantly changing during the measurement time. Typically, prediction of temperature is performed by monitoring the measured temperature over a period of time and the rate of change thereof. and processing these two variables to predict the patient's temperature. The advantage of this predictive thermometer is that a rapid temperature determination offers more timely diagnostic information. However, a disadvantage with such a thermometer is that the accuracy with which temperature is predicted declines markedly unless the processing and analysis of the data are accurately performed.

The accuracy of predicted temperature is strongly depended on the predictive mode employed in the stabilized temperature prediction method. For example, a temperature prediction equation is programmed to estimate a temperature rise curve in a conventional electronic predictive thermometer. This prediction equation obtains an increment from sampled temperature points. This increment is added to actually measured temperature. As such, a predicted stabilization temperature is obtained prior to reaching an equilibrium between thermometer and the patient. For achieving this, some parameters are predetermined for decreasing errors in the equation. It is known that temperature rise curves of different persons are different. Even the temperature rise curve of mouth is different from that of armpit in the same person. As such, the prediction equation even in conjunction with temperature characteristics of probe used in estimating the stabilized temperature, an accurate prediction of temperature is still not possible.

One prior art approach is disclosed in U.S. Pat. No. 5,738,441 in which the processor selects the first time frame from a time period occurring before the sensor reaches the temperature of the object and uses the logarithm of the characteristics of the temperature signals of the first time frame to calculate a prediction of the temperature of the object. This approach may rapidly predict the temperature of object based on the assumption that the object has an unlimited heat source. However, the heat source of human body is limited. Thus this assumption is not supported, thereby limiting the application of this patent. Another limitation not considered in the patent is the characteristics of probe. It is understood that sensor incorporated in probe is critical to the accuracy of temperature prediction. In detail, probe must uniformly transfer heat to sensor for obtaining an accurate value. However, factors such as dissipation in the heat transfer process, location of sensor, and so on all affect the accuracy of temperature prediction.

Another U.S. Pat. No. 5,632,555 discloses an electronic thermometer for decreasing the heat dissipation. This approach preheats sensor to predict temperature of the object, thereby eliminating errors caused by various factors during predicting process. This temperature prediction approach is rapid as well as significantly decreases errors. But this is unsatisfactory for the purpose for which the invention is concerned for the following reasons:

1. Additional electronics and power are required to effect a preheating.
2. Not cost effective. Thus the relatively high manufacturing cost inhibits its commercial availability.

SUMMARY OF THE INVENTION

It is thus an object of the present invention to provide an electronic thermometer and temperature prediction method therefor in which a compensation coefficient is included in the second-order predictive mode for eliminating errors caused by various factors during predicting process so as to rapidly precisely obtain a stabilized temperature measurement.

It is another object of the present invention to provide a temperature prediction method which only involved simple calculation and adjustment, thereby decreasing the time required to predict the stabilized temperature.

It is still another object of the present invention to provide an electronic thermometer for effectively decreasing error during the heat transfer process by providing a symmetrically shaped probe.

The advantages of the present invention are realized by providing an electronic thermometer and temperature prediction method therefor. The thermometer comprises a sensor and a processor wherein the sensor is provided in a symmetrical point in a symmetrically shaped probe for sensing the temperature data of a selected part of body and outputting the time dependent temperature data; and the processor functions as receiving output temperature data and combining the temperature data with a compensation coefficient to obtain a compensated temperature data. This effects to obtain an accurate prediction temperature before the probe reaching equilibrium with the body. The equation describing this process is as below:

$$y_2 = y_1 + \alpha \frac{dy_1}{dt} \qquad (A)$$

where $\alpha$ is the compensation coefficient which is obtained empirically from a person's mouth, armpit, or anus, $y_1$ is sensed temperature, and $y_2$ is electronic thermometer temperature data.

$$B = y_2 + \tau \frac{dy_2}{dt} \quad \text{(B)}$$

B is the temperature of measured object, τ is characteristics constant.

By substituting equation (A) into equation (B), an expanded equation is obtained:

$$B = y_1 + (\alpha + \tau)\frac{dy_1}{dt} + \alpha\tau\frac{d^2 y_1}{dt^2}$$

where y, and compensation coefficient α are known. Thus a stabilization temperature is obtained by applying sensed temperature into the above second-order differential equation for processor to process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
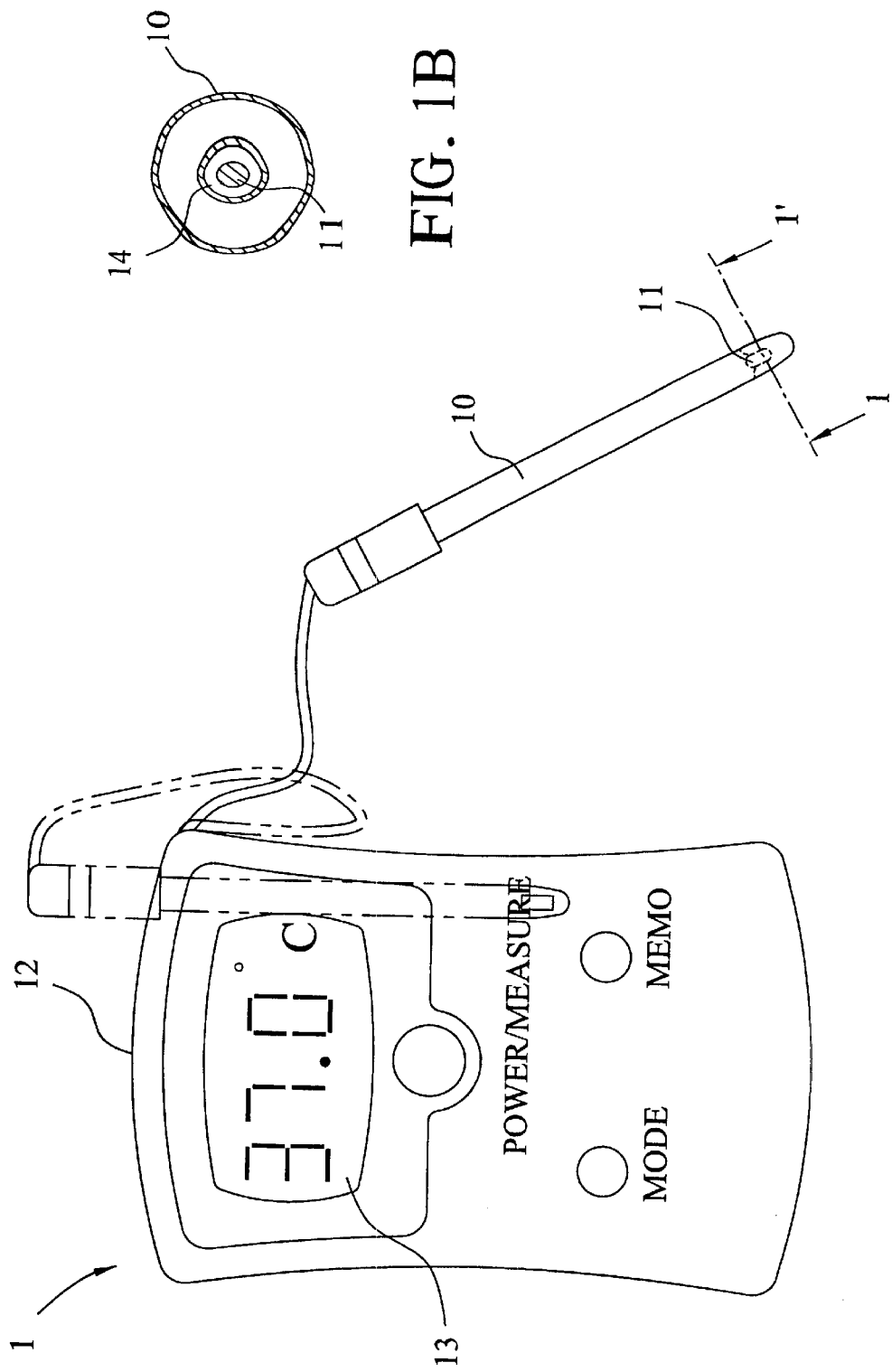
FIG. 1A is a front view of a preferred embodiment of an electronic thermometer of the invention.
FIG. 1B is a sectional view taken along lines 1–1'of FIG. 1A showing the position of sensor.

Referring to FIGS. 1A and 1B, there is shown an electronic thermometer constructed in accordance with the invention. Electronic thermometer 1 comprises a symmetrically shaped probe 10 having a sensor 11 provided in the symmetrical point for sensing temperature of a selected part of object and decreasing error occurred during the heat transfer process; a main body 12 having associated electronics such as processor (not shown) and power supply (not shown); and a display 13 on the housing of main body 12 for displaying temperature values and other messages.

The symmetrical point of sensor 11 in probe 10 refers to a central longitudinal recess 14 on the top of probe 10 (i.e., the distal end of probe 10 away from main body 12) (FIG. 1B).

Figure 2:
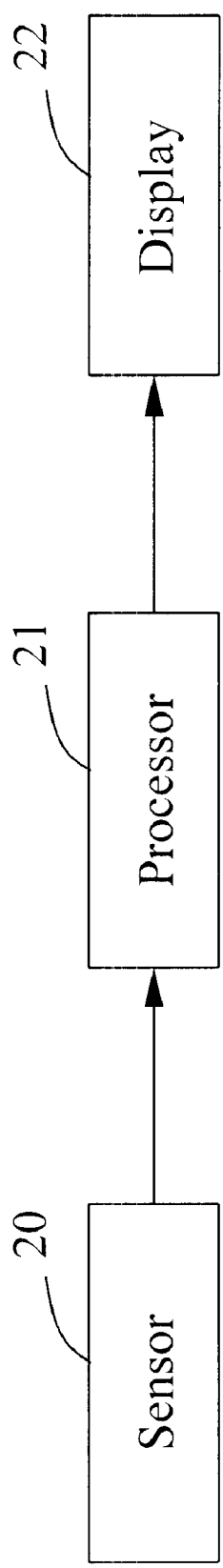
FIG. 2 is a block diagram of a system of the invention.

Referring to FIG. 2, the block diagram shows the major components of the invention comprising a sensor 20, a processor 21, and a display 22 wherein the sensor 20 acts as sensing the temperature data of a selected part of body and outputting the time dependent temperature data to processor 21; and the processor 21 functions as performing a number of processes based on received temperature data such as converting the analog temperature data into digital data, recording temperature data, and sampling time data. Whereby, the stabilization temperature can be estimated based on these sampled data. One major aspect of the invention is that a compensation coefficient is included in the predictive mode which is further processed in processor 21 for achieving the purpose of rapidly precisely obtaining a stabilized temperature measurement. This stabilization temperature is sent to display 22 for displaying by processor 21.

Following is a discussion of the concepts incorporated by the invention:

In brief, the temperature prediction has two processes. First, a first-order approach is to sample six temperature data which are further used to obtain two predicted temperatures. Second, a compensation coefficient is added to the stabilization temperature predictive mode for predicting the stabilization temperature, thereby obtaining an accurate temperature measurement. The equation describing the first process is as below:

Assumes the temperature to be measured is represented as $$B = y + \tau \frac{dy}{dt} \quad (1)$$

where B is the temperature of object, y is the measured temperature as a function of time y(t), t is time, τ is the characteristics constant of the object to be measured.

Then make a simplification and perform an operation on equation (1) we obtain:

$$\tau \frac{dy}{dt} = y - B = 0, \quad \tau dy + (y - B)dt = 0 \quad (2)$$

Multiplying an integral factor F(t) to the left and right of the equation (2), we obtain:

$$F(t)*\tau*dy + F(t)(y-B)dt = 0,$$

$$\frac{d[F(t)*\tau]}{dt} = \quad (3)$$

$$\frac{d[F(t)(y-B)]}{dy} = \frac{d[F(t)*y]}{dy} - \frac{d[F(t)*B]}{dy} = \frac{d[F(t)*y]}{dy} = F(t)$$

Exchanging dt and F(t) we have $$dt = \frac{d[F(t)*\tau]}{F(t)}$$

Integrating both sides of the above equation we have $$\int dt = \int \frac{d[F(t)*\tau]}{F(t)} = \int \tau * \frac{1}{F} dF = \tau * \ln |F(t)|,$$

$$F(t) = e^{\int \frac{1}{\tau} dt} = e^{\frac{-t}{\tau}} \quad (4)$$

Substituting equation (4) into equation (3) we obtain $$y = B + Ce^{\frac{-t}{\tau}}$$

where C is a constant.

Constant C is calculated from initial temperature of object. Time is zero (i.e., t=0) in the beginning of measurement. The temperature measured by sensor 20 is room temperature. Set $y=y(t_0)=T_r$. Substitutes t=0 and $y=T_r$ into equation (5) to obtain constant $C=T_r-B$. Substitute constant C into equation (5) again we have $y(t)=B+(T_r-B)e^{-\tau^t}$. This equation expresses the relationship between measured temperature and temperature of the object to be measured. Then illustrates how to use above equations to predict a stabilization temperature.

Assume the sensed temperature at 1 second t1=1 sec is:

$$T_1 = B + (T_r - B)e^{-\frac{t_1}{\tau}}, \quad \tau = \frac{-t_1}{\ln\left(\frac{T_1-B}{T_r-B}\right)}$$

Assume the sensed temperature at 2 seconds t2=2 sec is:

$$T_2 = B + (T_r - B)e^{-\frac{t_2}{\tau}}, \quad \tau = \frac{-t_2}{\ln\left(\frac{T_2-B}{T_r-B}\right)}$$

Further, characteristics constant τ is same to the identical object to be measured. Hence $$\tau = \frac{-t_1}{\ln\left(\frac{T_1-B}{T_r-B}\right)} = \tau = \frac{-t_2}{\ln\left(\frac{T_2-B}{T_r-B}\right)}, \quad \frac{t_1}{t_2} = 2,$$

That is, $$\frac{t_1}{t_2} = 2 = \ln\left(\frac{T_2-B}{T_r-B}\right) \Big/ \ln\left(\frac{T_1-B}{T_r-B}\right),$$

$$\frac{T_2-B}{T_r-B} = \left(\frac{T_1-B}{T_r-B}\right)^2$$

The temperature of object to be measured is represented as $$B = \frac{T_1^2 - T_2 * T_r}{2T_1 - T_2 - T_r} \quad (6)$$

Thus only three temperatures (i.e., initial temperature and two temperatures measured in two time slots) are required in above equation in order to obtain the temperature of measured object. The two temperature measurement time slots must be equal. For example, 1 second and 2 seconds above. In this process, sensor 20 measures six temperatures. Substitute them into equation (6) to obtain two predicted temperatures of object.

A compensation coefficient is used by the invention to increase the accuracy of temperature predicted by the above method wherein compensation coefficient is added to the above two temperature data respectively so as to convert the first-order asymptotic prediction approach into a second-order asymptotic prediction approach which is more accurate than the first-order asymptotic prediction approach. The compensation equations incorporated with compensation coefficient are expressed as follow:

$$y_2 = y_1 + \alpha \frac{dy_1}{dt} \quad (A)$$

$$B = y_2 + \tau \frac{dy_2}{dt} \quad (B)$$

where $y_1$ is obtained temperature from equation (6). α is compensation coefficient obtained empirically from a person's mouth, armpit, or anus. For example, the compensation coefficient of mouth is 1, armpit is 0.8, and anus is 0.7. This set of compensation coefficient is stored in processor 21. It is known that temperature rise curves of different part of body are different. Based on this characteristics, processor 21 will add an appropriate compensation coefficient into the equation (A) during the compensation process. $y_2$ is the temperature data after compensated. From two $y_1$ values, two compensated temperatures $y_2$ are obtained. B is temperature of object to be measured. ι is characteristics constant of object to be measured.

Substitute equation (A) into equation (B) we have $$B = y_1 + (\alpha + \tau)\frac{dy_1}{dt} + \alpha\tau\frac{d^2y_1}{dt^2}$$

i.e., a second-order differential equation. $y_1$ and compensation coefficient α are known. B and ι are unknown. Thus two equations are required to solve these two variables. Compensates a set of sensed temperature data $y_1$ to obtain equation (A). For example, temperature data $y_{1a}$ and $y_{1b}$ obtained in the first process are compensated to become $y_{2a}$ and $$y_{2b}, \text{ i.e., } y_{2a} = y_{1a} + \alpha\frac{dy_{1a}}{dt} \text{ and } y_{2b} = y_{1b} + \alpha\frac{dy_{1b}}{dt}$$

Substitute equation (A) into equation (B) we obtain two equations $$B = y_{1a} + (\alpha + \tau)\frac{dy_{1a}}{dt} + \alpha\tau\frac{d^2y_{1a}}{dt^2} \text{ and}$$

$$B = y_{1b} + (\alpha + \tau)\frac{dy_{1b}}{dt} + \alpha\tau\frac{d^2y_{1b}}{dt^2}$$

Because $y_{1a}$, $y_{1b}$, and compensation coefficient α are known, processor 21 can obtain an accurate temperature measurement based on these two second-order equations after processing.

Figure 3:
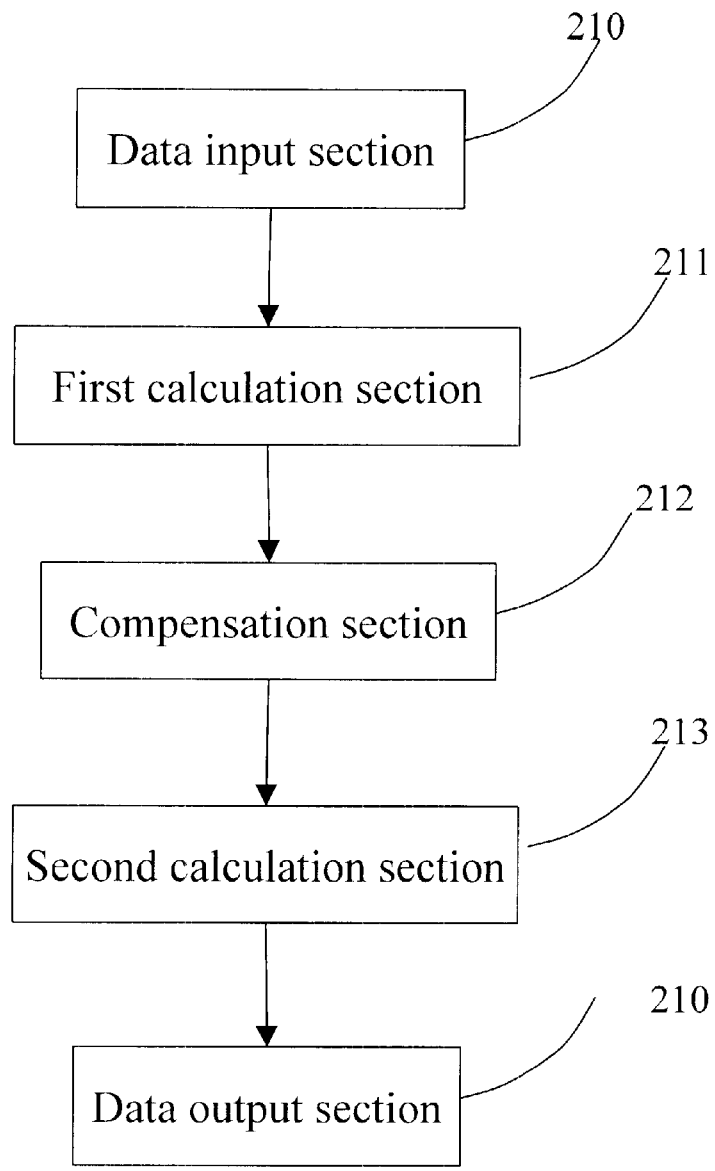
FIG. 3 is a detailed block diagram of the processor in FIG. 2 for predicting the stabilization temperature.

Referring to FIG. 3, processor 21 comprises a data input section 210, a first calculation section 211, a compensation section 212, a second calculation section 213, and a data output section 214 wherein data input section 210 receives sensed temperature data from sensor 21, converts the analog temperature data into digital data, and records temperature data for subsequent process by processor 21; first calculation section 211 calculates a predictive temperature of the first process based on the temperature data in the data input section 210 and above equation (6), and sends the result to compensation section 212; compensation section 212 stores predetermined compensation coefficients such as 1 for mouth, 0.8 for armpit, and 0.7 for anus in which one of the thermometers is automatically added to the corresponding equation based on temperature rise curve, the electronic thermometer temperature is calculated from equation (A)

which is further sent to second calculation section 213; and second calculation section 213 calculates the stabilization temperature from equation (B) and sends the resultant temperature to data output section 214.

Figure 4:
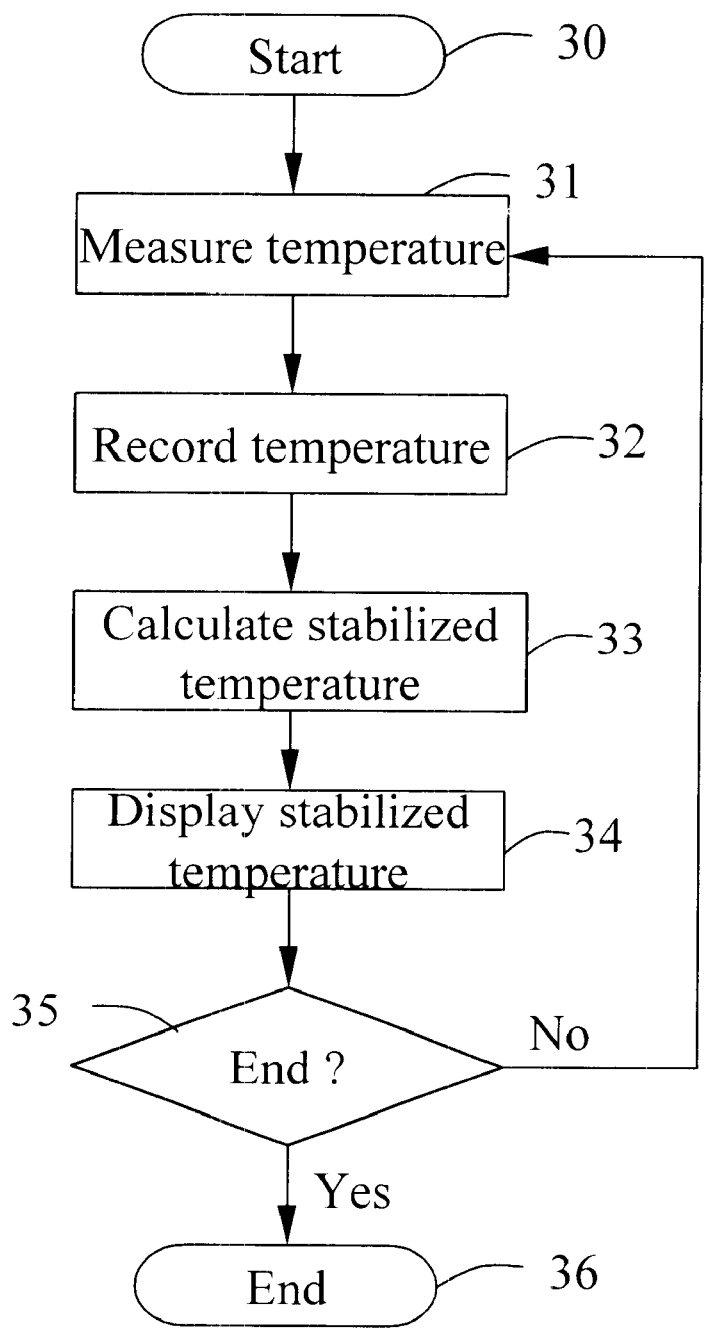
FIG. 4 is a flow diagram of the processing of the invention.
Figure 5:
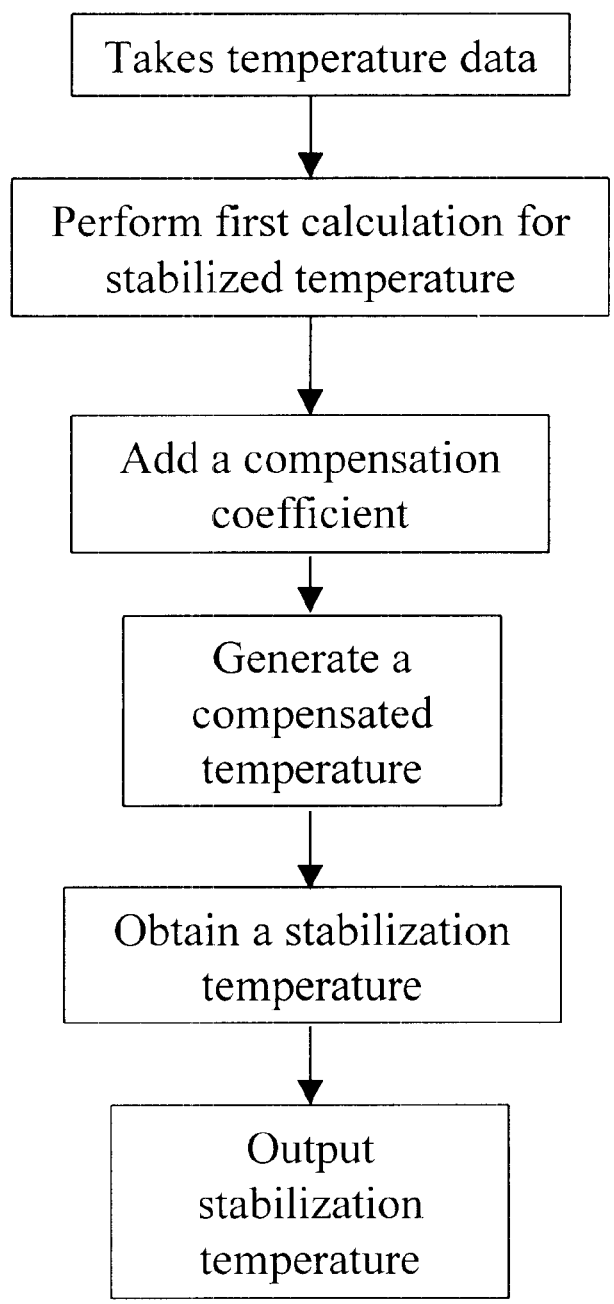
FIG. 5 is a flow diagram for calculating the stabilization temperature of the invention.

Referring to FIG. 4, the flow chart diagram of the invention is illustrated. It is initialized in step 30. Next it measures temperature in step 31, i.e., sensor 20 senses temperature data which is further sent to processor 21. Processor 21 continuously records temperature data from sensor 20 in step 32. The temperature data and time data, which measured in respective temperature sensing process, are associated with each other. Processor 21 calculates a stabilized temperature in step 33 based on sensed temperatures. In this embodiment, only three temperatures (i.e., initial temperature and two temperatures measured in two time slots after measurement begun) are required to predict temperature. Then adds an appropriate compensation coefficient to the sensed temperature data for processor 21 to calculate a stabilized temperature. Processor 21 sends the stabilized temperature to display 22 to display in step 34. Determines whether it is at the end of process in step 35. If yes, goes to step 36. Otherwise, loops back to step 31. The process ends in step 36.

The step 33 further comprises the steps of: a) in step 331. data input section 210 takes temperature data. Note that six temperatures are required because there are two compensated temperatures. These six temperatures must be measured in equal interval; b) in step 332, first calculation section 211 performs a first calculation on these temperature data based on equation $$B = \frac{T_1^2 - T_2 * T_r}{2T_1 - T_2 - T_r}$$

wherein three temperatures are required; c) in step 333, compensation section 212 automatically adds a compensation coefficient to the corresponding equation based on temperature rise curve of the measured part; d) in step 334, generates a compensated temperature based on equation $$y_2 = y_1 + \alpha \frac{dy_1}{dt}$$

in step 335, substitutes two compensated temperatures into $$B = y_2 + \tau \frac{dy_2}{dt}$$

to obtain a set of second-order differential equations for obtaining a stabilization temperature therefrom; and f) in step 336, outputs the stabilization temperature.

ADVANTAGES OF THE INVENTION

This fulfils the objects of the invention as below:

Rapidly precisely obtain a stabilized temperature measurement.

Offers more timely diagnostic information for nurse and/or physician.

Only simple predictive mode is involved.

No logarithm and/or intensive calculation are required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic thermometer for determining the temperature of a human body, comprising:

a symmetrically shaped probe having a symmetrical point;

a sensor provided in the symmetrical point in the probe for sensing temperatures of the human body and outputting the sensed temperatures; and a processor for sampling the sensed temperatures at a plurality of times, performing a first temperature calculation to obtain an initial prediction of temperature, and applying a selected compensation coefficient in a first first-order differential equation (A) to calculate a compensated temperature, and using the calculated compensated temperature in a second first-order differential equation (B) to calculate a final prediction of temperature, wherein:

the compensation coefficient is selected from a plurality of different compensation coefficients, based on a rate of change of the sensed temperatures, different parts of the human body having different compensation coefficients associated therewith; and the first first-order differential equation (A) comprises a first derivative of each of the sampled sensed temperatures; and the second first-order differential equation (B) comprises a first derivative of the compensated temperature;

whereby the electronic thermometer calculates a second order prediction of the temperature of the human body based on the compensated temperature before the sensor has reached the temperature of the human body.

2. The electronic thermometer of claim 1, wherein an initial temperature sensed by the sensor comprises room temperature.

3. The electronic thermometer of claim 1, wherein the compensation coefficient is 0.9 to 1.1 in the mouth of the human body.

4. The electronic thermometer of claim 1, wherein the compensation coefficient is 0.7 to 0.9 in the armpit of the human body.

5. The electronic thermometer of claim 1, wherein the compensation coefficient is 0.6 to 0.8 in the anus of the human body.

6. In an electronic thermometer having a probe, a sensor for sensing temperatures, and a processor, a method for calculating the temperature of a human body comprising the steps of:

a) obtaining a plurality of temperatures from the human body;

b) performing a first calculation on the temperatures to obtain an initial prediction of the temperature of the human body;

c) in a first first-order differential equation (A), applying a compensation coefficient selected from a plurality of different compensation coefficients, based on a rate of change of the plurality of temperatures, different parts of the human body having different compensation coefficients associated therewith;

d) generating a compensated temperature based on a combination of the initial prediction of the temperature of the human body and the compensated coefficient; and e) in a second first-order differential equation (B), calculating a stabilized prediction of the temperature of the human body based on the compensated temperature before the sensor has reached the temperature of the human body.

7. The method of claim 6, wherein the temperatures sensed by the sensor comprise an initial temperature.

8. The method of claim 7, wherein the initial temperature is room temperature.

9. The method of claim 6, wherein the temperatures obtained in the step a) are equally spaced in time from each other.

10. The method of claim 6, wherein the compensation coefficient is a slope of the first-order differential equation.

* * * * *